(12) United States Patent
Mahe

(10) Patent No.: US 6,665,363 B1
(45) Date of Patent: Dec. 16, 2003

(54) METHOD OF INSPECTING THE WELDING OF A SEALED CLOSURE PLUG OF A NUCLEAR REACTOR FUEL ELEMENT

(75) Inventor: Philippe Mahe, Montmiral (FR)

(73) Assignee: Societe Franco-Belge de Fabrication de Combustible-FBFC, Courbecoie (FR)

( * ) Notice: Subject to any disclaimer, the term of this patent is extended or adjusted under 35 U.S.C. 154(b) by 48 days.

(21) Appl. No.: 10/088,776

(22) PCT Filed: Aug. 9, 2000

(86) PCT No.: PCT/FR00/02284

§ 371 (c)(1),
(2), (4) Date: Jun. 11, 2002

(87) PCT Pub. No.: WO01/22428

PCT Pub. Date: Mar. 29, 2001

(30) Foreign Application Priority Data

Aug. 9, 2000 (FR) ............................................ 99 11842

(51) Int. Cl.$^7$ .............................................. G21C 17/00
(52) U.S. Cl. ......................... 376/248; 376/245; 376/451
(58) Field of Search ................................ 376/248, 245, 376/451

(56) References Cited

U.S. PATENT DOCUMENTS

| | | | |
|---|---|---|---|
| 4,857,260 A | | 8/1989 | Schoenig, Jr. et al. |
| 5,168,141 A | * | 12/1992 | Tashjian et al. ....... 219/121.63 |
| 5,231,261 A | * | 7/1993 | Duthoo ................. 219/121.63 |
| 5,359,672 A | * | 10/1994 | Okumura et al. ........... 382/168 |
| 5,602,885 A | | 2/1997 | Ahmed et al. |
| 5,923,555 A | * | 7/1999 | Bailey et al. ............... 700/114 |
| 5,958,267 A | * | 9/1999 | Lingenfelter et al. .. 219/121.63 |

FOREIGN PATENT DOCUMENTS

EP      0 177 686      9/1984

* cited by examiner

Primary Examiner—Charles T. Jordan
Assistant Examiner—R Palabrica
(74) Attorney, Agent, or Firm—Kenyon & Kenyon

(57) ABSTRACT

Before welding, the plug and the sleeve of the fuel rod being in the welding position at the welding station, the sleeve and the plug of the fuel rod are rotated about their common axis with the aid of rotation means, images are taken along the periphery of the fuel element to obtain digitized images, the digitized images are analyzed to determine the position of the joint plane between the sleeve and the plug of the fuel rod, and the rotation of the fuel element is verified. It is deduced whether it is possible to perform the welding or not. If welding is performed, images are taken of the fuel element along the periphery of the fuel element, in the vicinity of a joint line between the sleeve and the plug, to obtain digitized images which are analyzed to check the conformance of a weld made along the joint line.

8 Claims, 12 Drawing Sheets

Position: 0.000 mm
Width: 0.049 mm
Element-electrode: 0.653 mm

CONFORM

Position: -0.196 mm
Width: 0.049 mm
Element-electrode: 0.702 mm

NON-CONFORM

CONFORM

NON-CONFORM

Position: -0.0413 mm
Width: 0.0827 mm

CONFORM

Position: 0.1516 mm
Width: 0.0482 mm

NON-CONFORM

Position: 0.0138 mm
Width: 1.6124 mm

CONFORM

Position: 0.0138 mm
Width: 1.6124 mm
CONFORM

Position:
Width: 0.0000 mm
NON-CONFORM

METHOD OF INSPECTING THE WELDING OF A SEALED CLOSURE PLUG OF A NUCLEAR REACTOR FUEL ELEMENT

FIELD OF THE INVENTION

The invention relates to a method of inspecting the welding of a sealed closure plug of a nuclear reactor fuel element.

BACKGROUND INFORMATION

Nuclear reactors, such as those cooled by pressurised water, include a core made up of fuel assemblies in which energy in the form of heat is produced during the operation of the reactor.

Each of the fuel assemblies is generally constituted of a bundle of parallel fuel elements retained in the framework of the fuel assembly. Each of the fuel elements includes a tubular sleeve made from a material that is poor at absorbing neutrons, such as a zirconium alloy, in which are stacked nuclear fuel pellets, for example sintered pellets of uranium oxide ($UO_2$). The tubular sleeve is closed at both ends by a plug which has a cylindrical part which is inserted coaxially into an end part of the sleeve. The plug and the sleeve are then welded together along a circular line in a plane substantially perpendicular to the axis of the sleeve and the plug.

The fabrication of fuel elements requires many successive operations of filling the sleeve with the fuel pellets, fitting and welding the plugs and introducing a pressurised inert gas such as helium into the sleeve sealed by the plugs. Many inspection operations must be carried out during all steps of fuel element fabrication so that fuel elements are obtained with zero defects.

In particular, the welds between the plugs and the ends of the sleeve must be rigorously inspected.

The plugs are welded in a welding station including a sealed chamber containing an inert gas atmosphere into which part of the end of the sleeve with a plug inserted in it is introduced. The sleeve and the plug are coupled to a system for rotating them about their common axis inside the sealed welding chamber. The welding is effected by melting parts of the sleeve and the plug disposed one against the other in a joint plane perpendicular to the axis of the fuel element. A welding system such as a TIG welding torch or a laser beam welding head is used to melt the plug and the sleeve in the welding area. The electrode of the TIG welding torch or the beam from the laser welding head is disposed in the plane of the joint and substantially perpendicular to the axis of the fuel element. The plug has a shoulder between the cylindrical part inserted into the sleeve and a larger diameter part which remains outside the sleeve. Because of the accuracy with which the end surfaces of the sleeve and the plug are machined, the contact between the end part of the sleeve and the shoulder on the plug cannot be perfect and in practice the joint plane consists of the edge surface at the end of the sleeve and the surface of the shoulder on the plug, which are separated by a small annular interstice. When the weld is effected by melting the sleeve and the plug in the joint plane, the interstice must be closed and entirely filled with molten metal to obtain a perfect seal of the joint between the plug and the sleeve of the fuel element.

To obtain a proper weld it is necessary for the joint plane as just defined to be perfectly located relative to the welding axis, which is the axis of the electrode in the case of TIG welding or the axis of the beam in the case of laser welding.

After the weld is executed, it is necessary to verify that the plug and the sleeve were melted all around the circular joint line, inside the joint plane, and that there is no discontinuity in the weld, which could lead to a defective seal.

What is more, to avoid reducing the productivity of the production line, the welds between the plugs and the sleeves of the fuel elements must also be inspected in such a way that the fuel element fabrication time is not unduly increased. It is also desirable to allow for producing a fast diagnosis indicating whether the fuel element can be accepted.

Optical inspection of fuel element welds based on digitized images obtained by a scanning camera coupled to an image digitizer system has been proposed, for example in U.S. Pat. No. 5,602,885.

From each digitized image, a matrix is obtained of values of the reflective power of each pixel of the image, arranged in columns and rows of the image. A mean value of the reflective power of the pixels of the image is calculated and compared to the reflective power of each pixel. If the values for a particular number of adjoining pixels, corresponding to an area of the weld having the minimum size of a defect that can be detected, depart from the mean value by an excessive amount, the presence of an unacceptable welding defect is diagnosed.

A method of the above kind is used in an inspection station separate from the welding station, which means that it is necessary to pass the welded fuel elements from the welding station to the inspection station. The handling time between the welding station and the inspection station and the time needed to perform the inspection are therefore added to the fuel element fabrication time.

It is also necessary to provide rotational control means to inspect the weld by taking images along the circular weld line.

What is more, the above method provides no way of monitoring the positions of the plug and the sleeve before welding or of effectively testing the conformance of the weld, regardless of the type of welding employed.

SUMMARY

The object of the invention is therefore to propose a method of inspecting the welding of a sealed closure plug of a fuel element for a nuclear reactor, the fuel element including a tubular sleeve enclosing a plurality of nuclear fuel pellets stacked in the axial direction of the sleeve and two sealed closure plugs having a cylindrical part inserted coaxially into an axial end part of the sleeve, a plug being welded in a welding station by melting the sleeve and the plug along a circular line in a joint plane perpendicular to the axis of the sleeve and the plug by a welding arrangement directed radially relative to the circular line in the joint plane of the sleeve and the plug, which are coupled to a rotation arrangement for rotating them about their common axis, inspection being effected by processing digitized optical images of areas of the fuel element adjoining the circular joint line and distributed along the periphery of the fuel element, this method checking that the plug is fitted correctly to the sleeve of the fuel element before welding, and checking the conformance of the weld, at the welding station, and in masked time, during the operation of welding the fuel element.

To this end before welding, the plug and the sleeve being in the welding position at the welding station, the sleeve and the plug are rotated about their common axis with the aid of the rotation arrangement, images are taken along the periphery of the fuel element to obtain digitized images, the digitized images are analysed to determine the position of the joint plane, and the rotation of the fuel element is verified, it is deduced whether it is possible to perform the welding, and if the welding is performed, after welding the plug to the sleeve of the fuel element, images are taken of the fuel element in position at the welding station, along the periphery of the fuel element, in the vicinity of the joint line, to obtain digitized images, and the digitized images are analysed to check the conformance of a weld made along the joint line.

BRIEF DESCRIPTION OF THE DRAWINGS

To explain the invention clearly, the implementation of the inspection method according to the invention will now be described by way of example and with reference to the accompanying drawings, in the case of TIG welding and in the case of laser welding of a plug to the sleeve of a fuel element of a pressurised water nuclear reactor.

FIG. 5 also relates to checking the position of the joint plane before welding. FIG. 5 further relates to checking the position of the joint plane before welding.

FIG. 6 also relates to checking the position of the joint plane before welding. FIG. 6 further relates to checking the position of the joint plane before welding.

FIGS. 7 also relates to inspecting the weld.

FIG. 8 relates to inspecting the weld.

FIG. 10 also relates to locating the joint plane.

FIG. 11 also relates to locating the joint plane.

FIG. 12 shows a pulsed laser weld.

FIG. 13 is also a diagram showing the grey level of points along a column of the image obtained during inspection inside and outside the weld area.

FIG. 14 is also a diagram showing the transitions along columns of the image between grey level minima and maxima which conform to the period of the welding pulses.

FIG. 15 is also a diagram deduced from the diagram of FIG. 14 by filtering to locate the edges of the weld.

DETAILED DESCRIPTION

Figure 1:
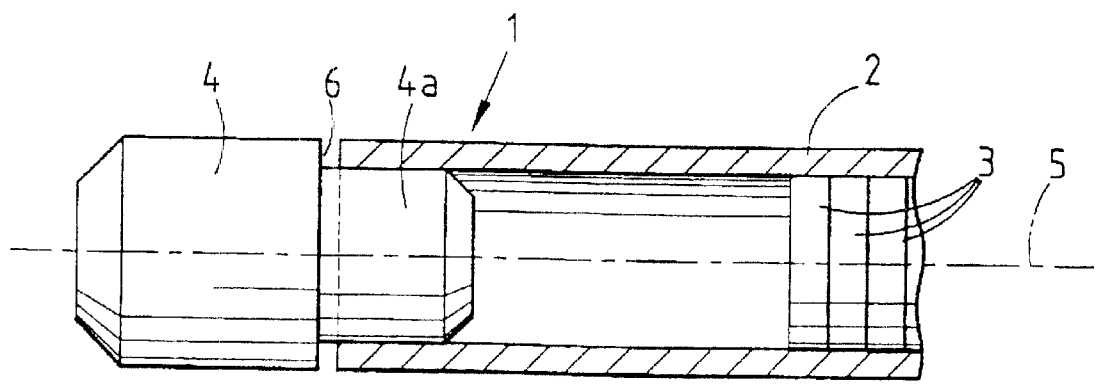
FIG. 1 is a partial view in axial section of the end of a fuel element before welding the closure plug.
Figure 2:
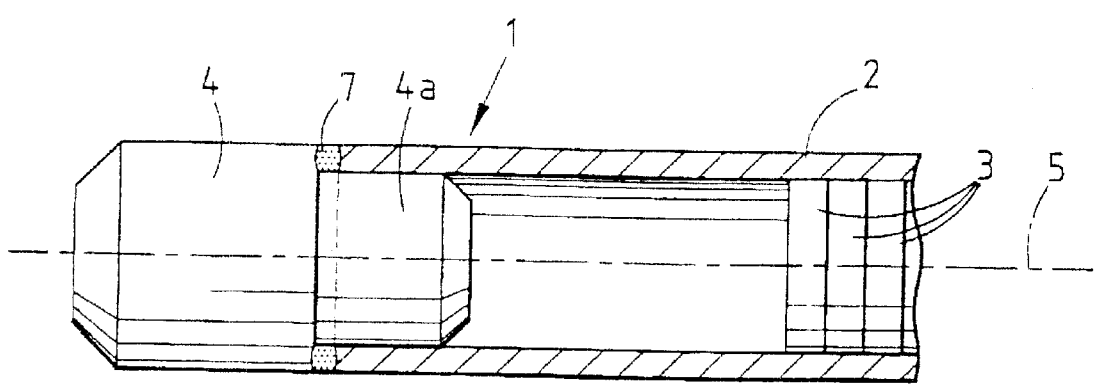
FIG. 2 is a partial view in axial section of the end of a fuel element after welding the closure plug.

FIGS. 1 and 2 show the end part of a fuel element 1 for a pressurised water nuclear reactor.

The fuel element 1 includes in particular a zirconium alloy tubular sleeve 2 which contains fuel pellets 3 and which is closed at its ends by plugs such as the plug 4 closing the end of the sleeve 2 shown in FIGS. 1 and 2.

The plugs 4 are generally made of zirconium alloy and have a part 4a which is inserted virtually without clearance into the end part of the bore of the sleeve 2.

As shown in FIG. 1, the plug 4 is inserted into the sleeve 2 in a coaxial arrangement, the axis of the plug and the axis of the sleeve 2 coinciding with the longitudinal axis 5 of the fuel element.

The plug 4 has a shoulder perpendicular to the axis 5 between its smaller diameter cylindrical part 4a which is inserted into the sleeve 2 and a part of the plug 4 which remains outside the sleeve. After the plug is inserted in the closure position, a very small annular interstice 6 remains between the shoulder on the plug and the end of the sleeve.

After the sleeve is welded, as shown in FIG. 2, the weld 7 fills and closes the interstice 6, joins the sleeve 2 to the plug 4, and seals the joint between the sleeve and the plug.

The welding is performed by rotating the sleeve 2 into which the plug 4 is inserted inside a welding station about the axis 5 common to the sleeve and the plug and melting the end of the sleeve 2 and a portion of the plug 4 using a welding device disposed radially relative to the circular joint line between the sleeve and the plug in a joint plane perpendicular to the axis 5 common to the sleeve 2 and the plug 4.

The expression "joint plane" refers to the area between two planes perpendicular to the axis 5, one plane containing the end of the sleeve 2 and the other plane containing the shoulder on the plug 4. Thus the circular joint line is in fact an annular area extending along the interstice 6 and in which the weld 7 is formed during welding.

Figure 3:
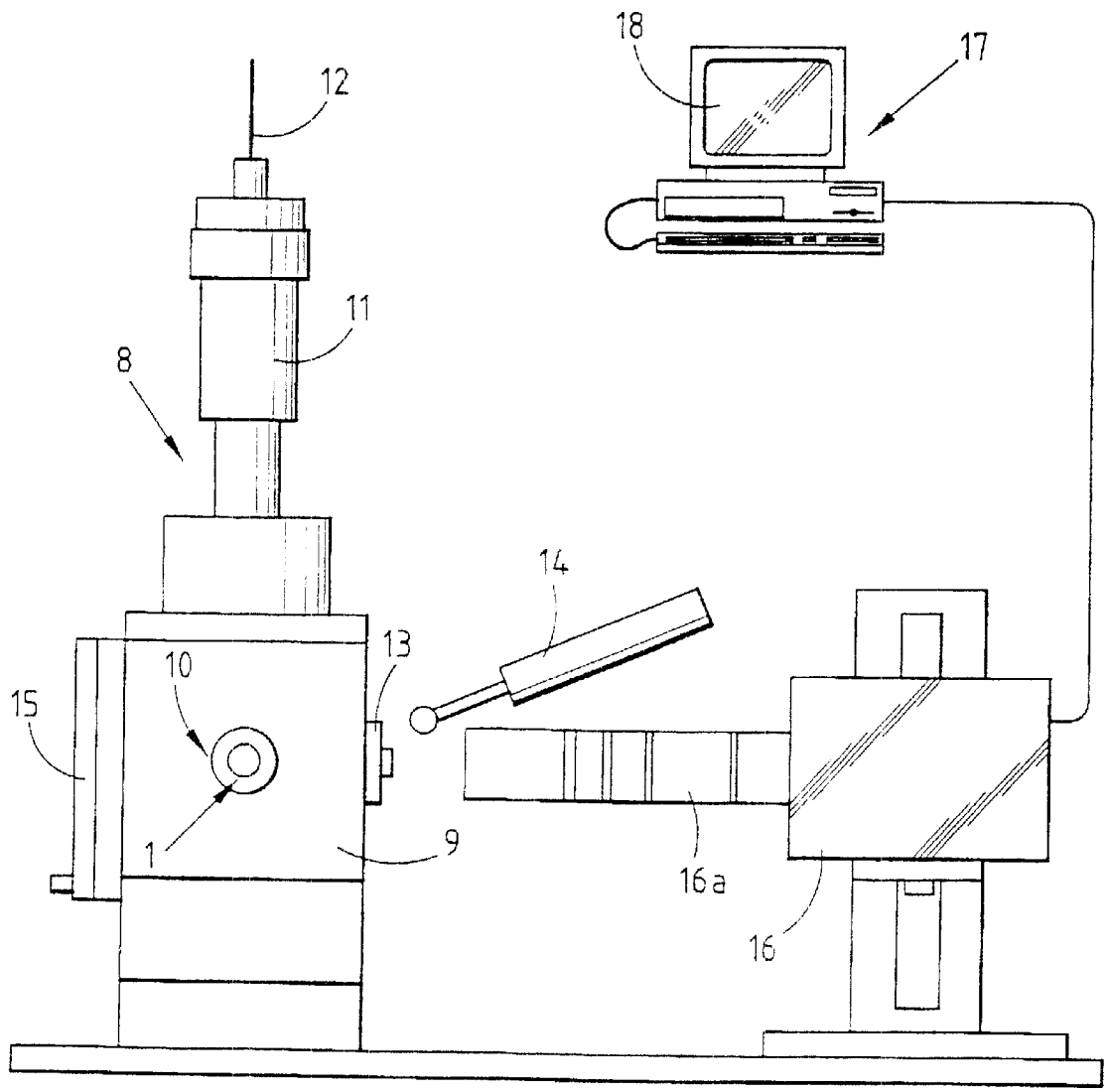
FIG. 3 is a diagrammatic view of a TIG welding station for fuel element plugs and control means used to implement the method according to the invention.

FIG. 3 illustrates a welding station of a first embodiment of the invention for welding plugs to the end parts of fuel elements by a TIG welding process, i.e. an electrical arc welding process carried out in an inert gas atmosphere using a tungsten electrode. FIG. 3 also illustrates an inspection system for implementing the method according to the invention.

The welding station 8 includes a closed and sealed welding chamber 9 which contains an inert gas such as argon and inside which plugs are welded to the end parts of fuel element sleeves.

The chamber 9 has on one of its lateral faces a sealed bushing 10 by which an end part of a fuel element 1 analogous to the end part of the fuel element shown in FIG. 1 passes through the wall of the chamber.

A vertical TIG welding torch 11 is mounted on the top face of the chamber 9 and includes a vertical tungsten welding electrode 12 which passes through the torch 11 and therefore enters the chamber, the end part of the electrode having an axis constituting the welding axis which is disposed in the joint plane between the plug and the sleeve of the fuel element 1 and in a direction perpendicular to the axis of the fuel element, i.e. a radial direction relative to the circular joint line between the plug and the sleeve of the fuel element 1.

To execute the welding, the electrode is fed with an electrical current with a potential difference between the electrode and the sleeve and the plug of the fuel element such that an electrical arc is struck between the joint area between the plug and the sleeve and the tip of the electrode, which is inside the sealed enclosure and at a small distance from the joint area.

A first lateral face of the welding chamber 9 perpendicular to the face carrying the sealed bushing 10 for the fuel element 1 includes a transparent porthole 13 through which light is directed towards the joint area of the fuel element by an illumination device 14. This first lateral face of the chamber 9 is referred to as the front face and the illumination device 14 is referred to as the front illumination device. A second or rear face of the chamber 9 carries a porthole and a rear (backlight) illumination device 15 for illuminating the joint area of the fuel element 1.

A digital camera 16 including an optical system 16a and a digitizer module is connected to a microcomputer 17 via an image acquisition card. The microcomputer 17 also includes a digital input/output card enabling the microcomputer to communicate with an automatic control system of the TIG welding equipment. In particular, after checking the position of the joint plane relative to the welding axis, the microcomputer communicates to the welding control system an instruction authorising or prohibiting welding, depending on the result of the check on the position of the joint plane. Similarly, a verdict is transmitted to the control system after inspecting the weld.

Images of the joint area of the fuel element 1 reach the optical part 16a of the digital camera 16 via the front porthole 13 and are digitized before they are transmitted to the microcomputer 17 via the image acquisition card.

The microcomputer 17 has a screen 18 on which the joint area of the fuel element and inspection results can be displayed.

As indicated above, a first step of the process of inspecting the weld in accordance with the invention is to check the position of the joint plane between the plug and the sleeve of the fuel element before welding.

In the case of TIG welding, the position of the joint plane is determined relative to the axis of the tungsten electrode, the width of the joint plane in the axial direction of the fuel element, and the distance between the tip of the electrode and the joint area of the fuel element, and a diagnosis relating to the position of the joint area relative to the electrode is produced.

The joint plane is inspected while sweeping the joint area of the fuel element inside the welding chamber with an inert gas and rotating the fuel element about its axis inside the welding chamber by a rotation system of the welding station.

In this way it is possible to locate and determine the position of the joint plane in a plurality of areas distributed around the periphery of the joint area of the fuel element.

For example, eight successive operations can be carried out to locate and determine the position of the joint plane in eight areas around the periphery of the fuel element, to determine the conformance of the position of the joint plane relative to the electrode. In this case, in order to issue a verdict concerning the conformance of positioning, it is possible to choose a number of conform searches, i.e. searches which reveal no defects in respect of the position or the width of the joint plane over the total number of joint plane location and determination operations effected. In the case of eight operations to locate and determine the position of the joint plane, for example, the number of conform searches chosen is five.

This procedure also verifies that the fuel element has rotated correctly between the successive operations to locate and determine the position of the joint plane.

The rotation of the fuel element is deemed to be non-conform if all the positions of the fuel element determined by the successive joint plane location and determination operations are identical.

Because the joint plane is in practice an area delimited between two planes perpendicular to the axis of the fuel element, the position of the joint plane is determined by the distance in the axial direction between at least one of the two planes and the axis of the electrode, the latter constituting the welding axis.

For example, in the case of the location process described below, the distance between the left-hand edge of the joint plane in the image and the axis of the tungsten electrode in the axial direction is determined.

The width of the joint plane corresponds to the axial distance between the end of the sleeve and the shoulder on the plug, i.e. the width of the interstice 6, which may vary along the circular joint line.

Figure 5:
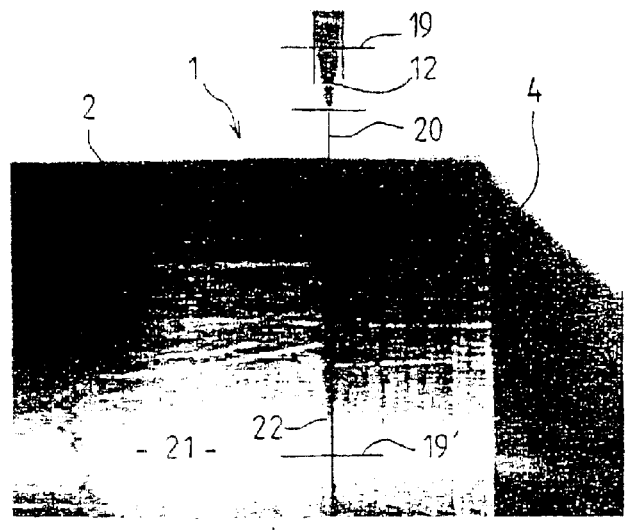
FIG. 5 is an image shown on the screen of the inspection system during execution of the method according to the invention in the case of TIG welding.
Figure 6:
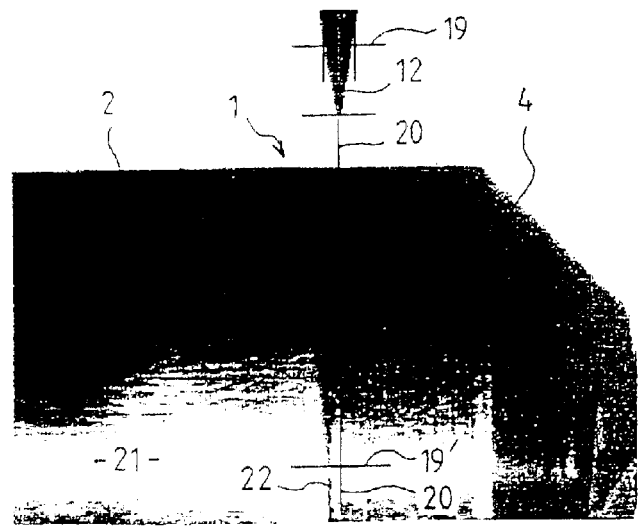
FIG. 6 is an image shown on the screen of the inspection system during execution of the method according to the invention in the case of TIG welding.

The first step is to carry out measurements relating to the electrode 12 on the digitized images, as shown in FIGS. 5 and 6.

The electrode is first located along an electrode search line 19 which is perpendicular to the joint plane, i.e. which is horizontal in the image displayed on the screen, as may be seen in FIGS. 5 and 6. A search is conducted along the search line 19 to find grey level transitions corresponding to the edges of the electrode 12. If the search does not find the electrode, a fault signal is issued.

The electrode search line 19 is automatically centred on a reference line 20. The search line and the reference line 20 are positioned visually if the TIG welding station has been set up correctly.

Following location of the electrode, the welding axis can be determined, and in the case of TIG welding corresponds to the axis of the electrode as found previously. A search for the joint plane 22, which corresponds to the interstice 6 between the fuel element and the plug, is then carried out (see FIGS. 5 and 6).

To this end, the fuel element and the plug 4 are illuminated in a maximum illumination area 21 inside the welding chamber that can be seen in FIGS. 5 and 6. The joint plane is located along search lines such as the line 19' in the illuminated area 21 shown in FIGS. 5 and 6.

The reference line 20, which is vertical in the image, is positioned at the left-hand edge of a theoretical joint plane, and the search lines are centred on the reference line; the position of the real joint plane is determined by the horizontal distance between the left-hand edge of the joint and the axis of the electrode previously determined. The width of the joint plane is determined by the horizontal distance between the left-hand edge and the right-hand edge of the joint.

The right-hand edge and the left-hand edge of the joint plane are looked for on search lines 19' centred on the reference line 20, using a processing method described below with reference to FIG. 9.

The distance between the tip of the electrode 12 and the fuel element is also measured, along the axis of the electrode previously found, i.e. in a vertical direction in the image, by measuring the distance between grey level transitions detected on that axis. The exit of the electrode at the tip is reflected in a black-white transition in the image and its entry into the fuel element by a white-black transition. The entry/exit distance in pixels is measured along a vertical column.

Figure 9:
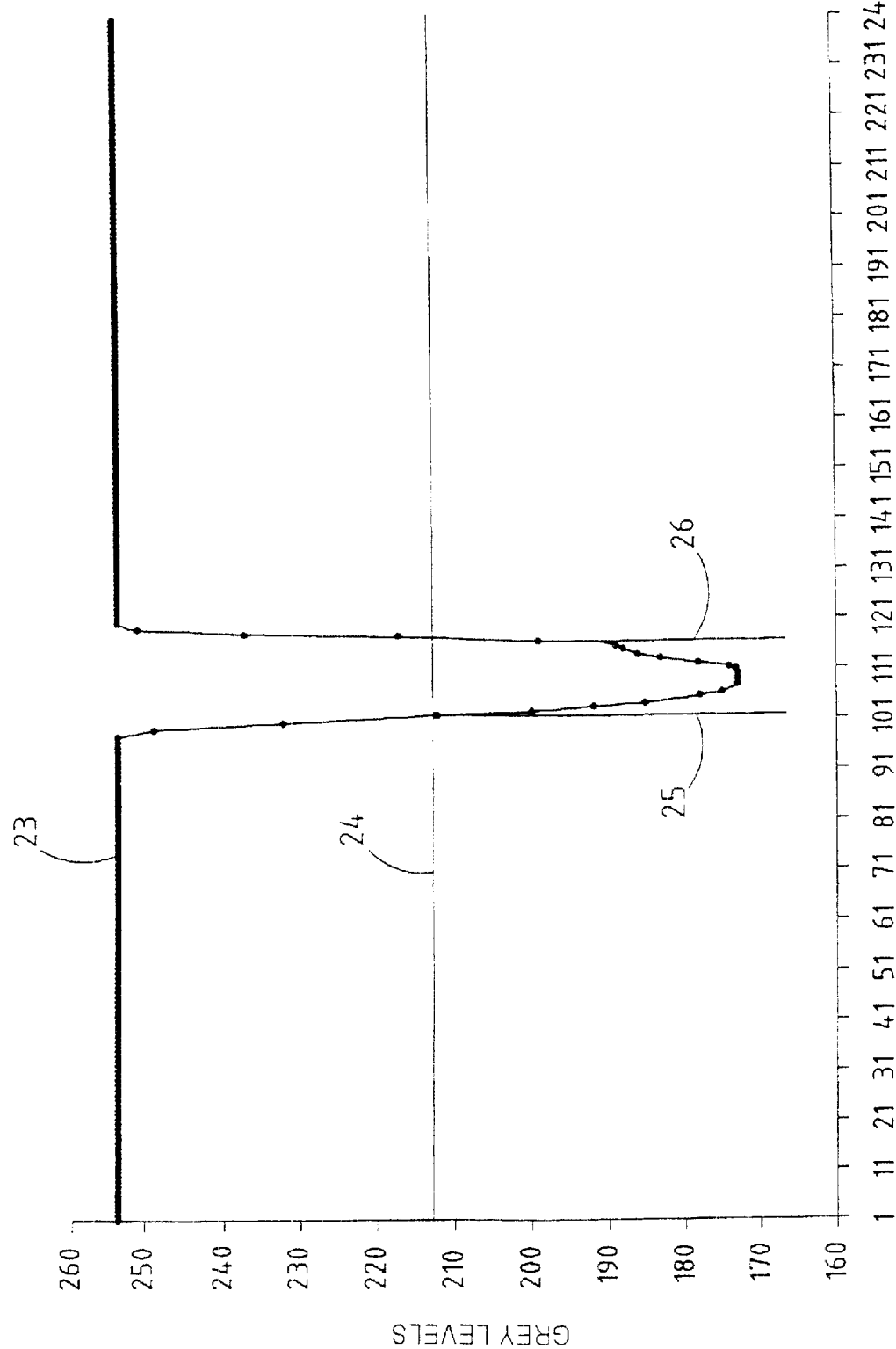
FIG. 9 is a diagram showing the grey level along a line of the image passing through the joint plane.

FIG. 9 illustrates the search for the joint plane and is a diagram giving the grey levels of pixels along a mean search line which is established during previous processing of the image.

A parameter N entered into the processing system corresponds to the number of rows above and the number of rows below the position of the search line, such as the line 19', and provides a mean of the grey levels over the corresponding 2×N rows. The parameter N is referred to as the mean number of rows. The curve 23 in FIG. 9 represents the grey levels along the mean line, with the points on the line plotted on the abscissa axis. There are 245 points for the whole of the line, for example.

The minimum and maximum values on the curve 23 representing the grey levels along the mean line are determined.

A threshold value is calculated and is equal to half the sum of the maximum value and the minimum value determined previously. A straight line segment 24 is drawn parallel to the abscissa axis and corresponds to this threshold value.

A search for the left-hand edge of the joint plane is then conducted based on the grey levels of the digitized image pixels, starting from the left-hand end of the mean search line. The left-hand edge is deemed to have been found as soon as three consecutive points are detected below the threshold shown by the straight line segment 24. The left-hand edge 25 of the joint plane is determined in this way. The position of the left-hand edge relative to the edge of the image is determined and the distance between the left-hand edge and the axis of the electrode found previously is calculated.

The position of the right-hand edge of the joint plane is then determined by considering the grey levels of the successive pixels from the right-hand end of the mean search line and comparing those grey levels to the threshold value represented by the straight line segment 24.

The right-hand edge 26 of the joint plane is deemed to have been reached as soon as three points are detected under the threshold.

The width of the joint between the left-hand edge 25 and the right-hand edge 26 can then be determined.

The values representative of the position of the joint, i.e. the distance between the left-hand edge of the joint and the axis of the electrode, and the width of the joint, are then compared to thresholds defined by the following parameters: left-hand electrode position tolerance, right-hand electrode position tolerance and maximum width of joint plane.

The results of the comparison are shown on the screen of the microcomputer 17.

If at least one threshold value is exceeded, a diagnosis is issued and an instruction is transmitted to the control system so that welding is not performed.

FIG. 5 illustrates the image appearing on the screen in the case of a satisfactory search for the joint plane 22, which is located exactly along the reference line 20 coincident with the axis of the electrode.

FIG. 6 illustrates the image appearing on the screen in the case of a non-conform joint plane, the joint plane 22 being offset to the left relative to the position of the reference line 20.

Similarly, unfavourable diagnoses can be issued if the distance between the tip of the electrode and the fuel element is outside the specified range or if the width of the joint plane is above a threshold value.

The search for the joint plane and the determination of its position and width can be effected in a plurality of areas at the periphery of the fuel element, which is rotated about its axis.

Continuous inspection of the joint plane is also possible by rotating the fuel element and taking successive images, each of which is processed before the next image is taken.

After carrying out the TIG welding, during the weld cooling phase, the weld is inspected in order to issue a final verdict on the quality of the weld, which is transmitted to the welding station control system.

The weld is inspected by a process identical to the joint plane search process, as described above. The presence of a defect is logged if the joint plane is detected.

If two consecutive defects are detected in the weld, inspection is stopped and the weld is declared defective in one area of the fuel element. Inspection continues as long as two consecutive defects are not detected. At the end of inspection the final verdict is sent to the welding station control system.

The weld is inspected in accordance with the following sequence: continuous acquisition of images of the weld, the next image being acquired during the processing of the previous image, location of the weld in each image; if N consecutive weld integrity defects are detected (generally two consecutive defects), inspection is stopped and the weld is declared defective; N is the reject threshold parameter, display of results.

Figure 7:
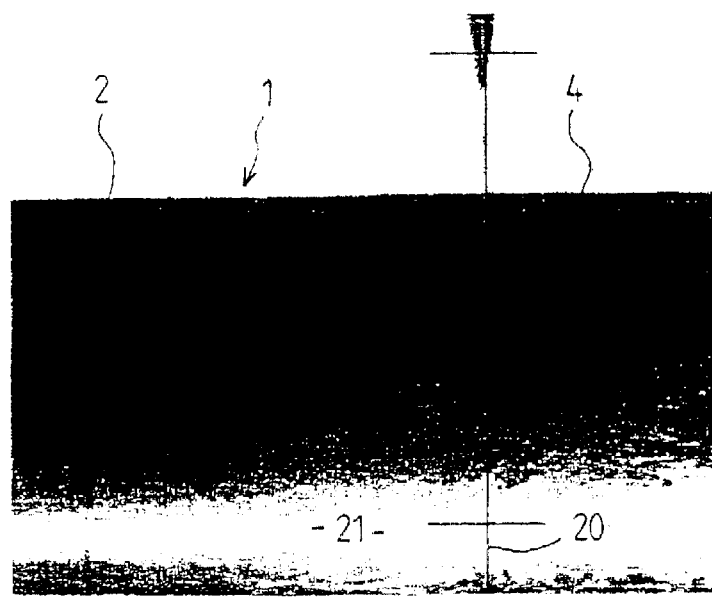
FIG. 7 is an image shown on the screen of the inspection system during execution of the method according to the invention in the case of TIG welding.

FIG. 7 illustrates a conform weld in a strongly illuminated area 21 of the fuel element 1, the weld being totally invisible in the image. No part of the joint plane appears in the image.

Figure 8:
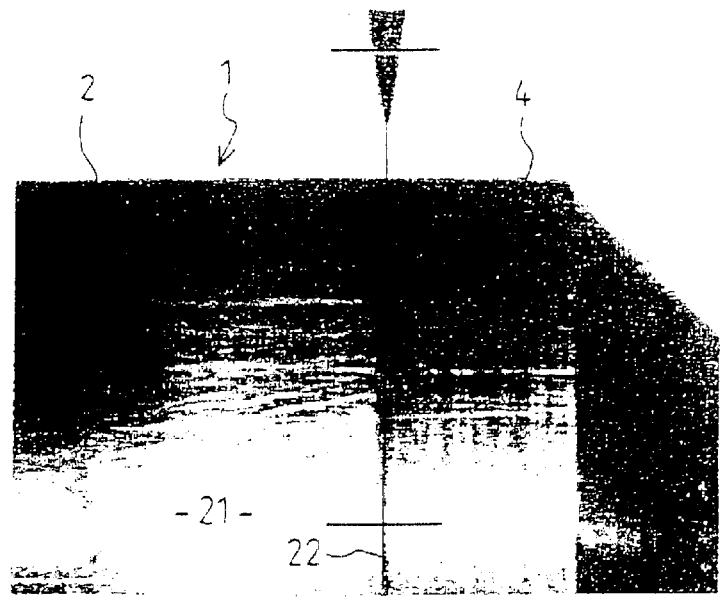
FIG. 8 is an image shown on the screen of the inspection system during execution of the method according to the invention in the case of TIG welding.

FIG. 8 illustrates a defective weld in a strongly illuminated area 21 of the fuel element 1. The joint plane 22 has been detected in this area.

Figure 4:
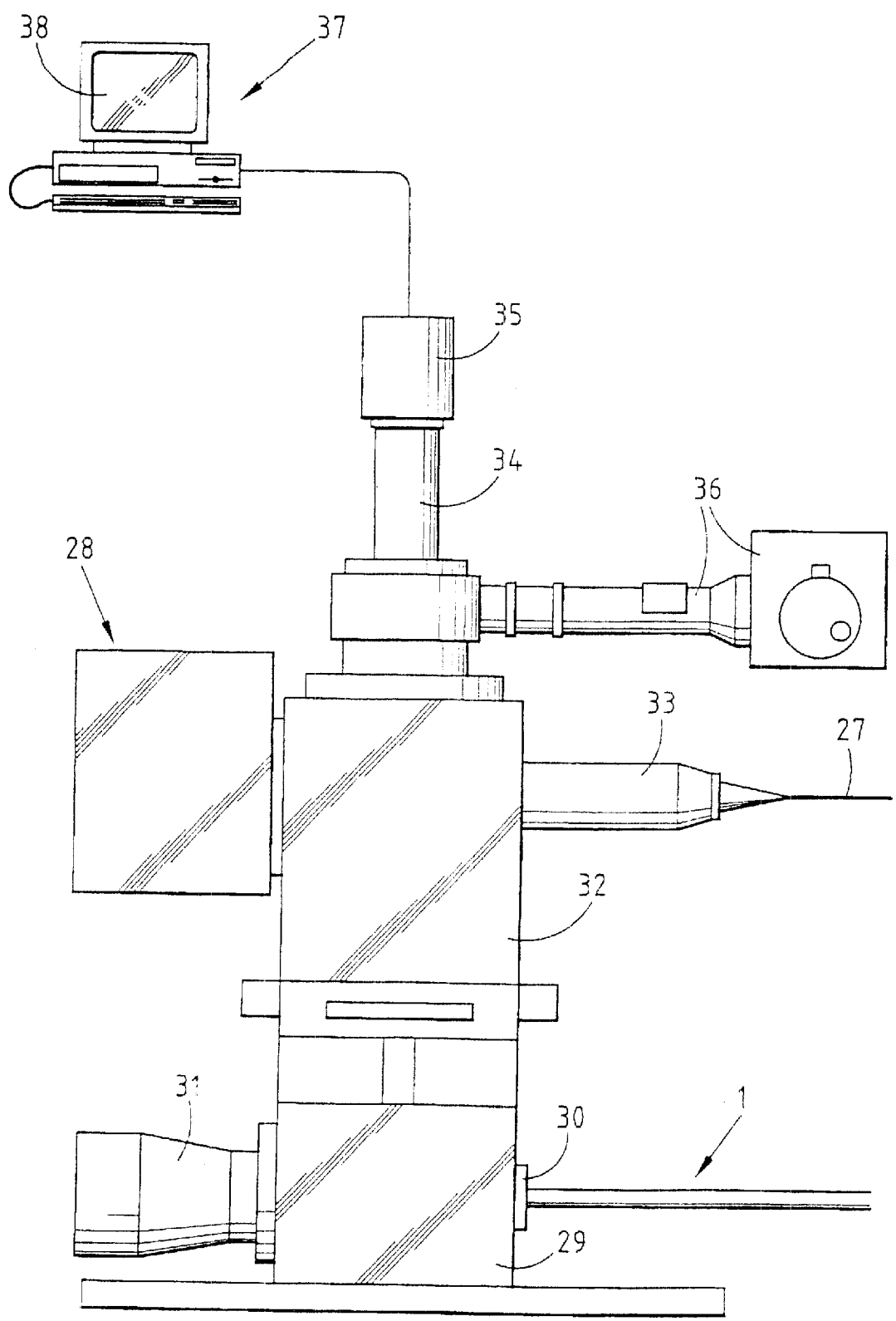
FIG. 4 is a diagrammatic view of a laser welding station for fuel element plugs and control arrangement used to implement the method according to the invention.

FIG. 4 illustrates a station for welding plugs to fuel elements using a laser beam and a system for inspecting the weld using a method according to the invention.

The welding station 28 includes a welding chamber 29 into which the end of the fuel element 1 including the plug is inserted through a sealed bushing device 30 passing through one lateral face of the chamber 29. An adjustable abutment device 31 fixed to the lateral face opposite the face including the bushing device 30 for the fuel element 1 adjusts the position of the joint area of the plug and the sleeve of the fuel element 1 relative to the laser beam welding device.

The welding station 8 includes in particular an optical system 32 which includes a mirror for deflecting and focussing the laser beam. The optical system 32 is connected to the laser generator by an optical fibre 27 connected to a collimator 33.

The optics 34 of a digital camera 35 and an illumination system 36 are fixed to the top face of an enclosure of the optical system 32.

The digital camera 35 is connected to a microcomputer 37 including a display screen 38.

As in the case of TIG welding, inspection of the joint plane before welding is followed by inspection of the weld if the joint plane is deemed to be conform.

The position of the joint plane is located and determined by a method similar to the method used in the case of TIG welding.

The method is therefore not described again.

However, the reference line relative to which the position of the edges of the joint plane is determined is defined and determined differently in the case of laser beam welding than in the case of TIG welding.

In the case of TIG welding, the reference line serves only to support the search lines 19 and 19'. The position of the joint plane is determined relative to the axis of the electrode, which is detected by image processing.

In the case of laser welding, a fixed reference is used in the form of a vertical line on the screen which constitutes a marker relative to which the position of the edges of the joint plane is determined.

After setting up the laser welding station, the laser is fired onto the surface of the fuel element and the reference line is chosen as the vertical line of the image passing through the trace of the laser beam. The reference line therefore corresponds to the welding axis. The position of the joint plane relative to the reference line and the width of the joint plane are determined and rotation of the fuel element is verified.

Figure 10:
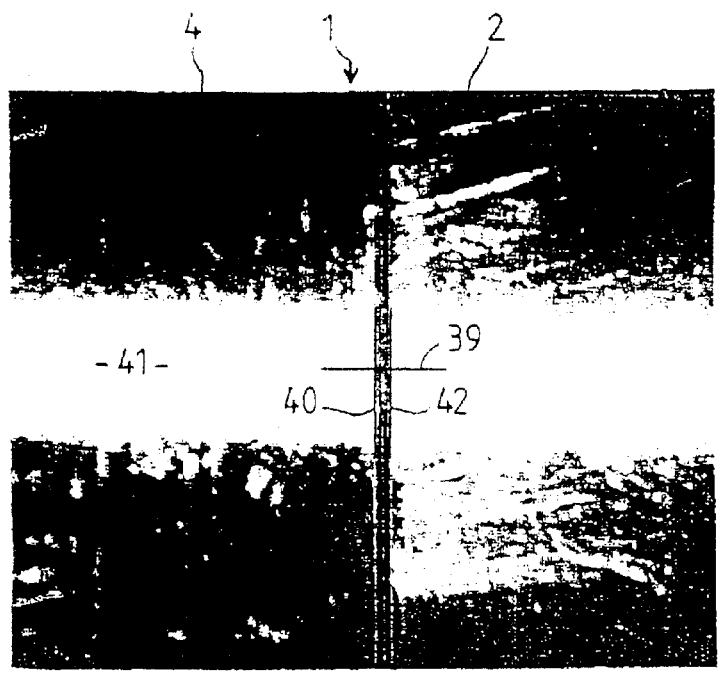
FIG. 10 is an image shown on the screen of the inspection system when the method according to the invention is used to inspect a laser weld.

FIG. 10 illustrates, in a strongly illuminated area 41 of the fuel element 1, the reference line 40, a joint plane search line 39 and the joint plane 40 and 42. The left-hand edge of the joint plane is coincident with the reference line 40 and the conforming width of the joint plane.

Figure 11:
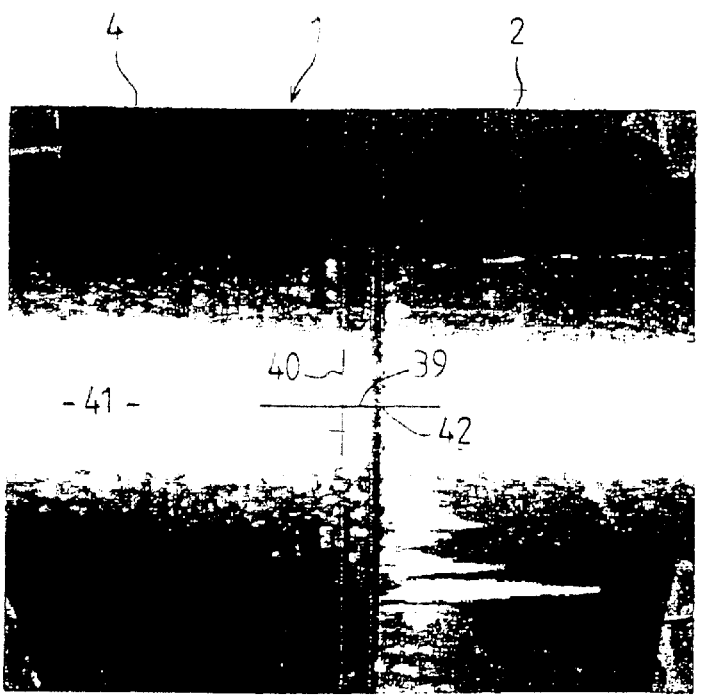
FIG. 11 is an image shown on the screen of the inspection system when the method according to the invention is used to inspect a laser weld.

FIG. 11 illustrates a non-conform joint plane 42 offset to the right relative to the reference line 40. If the joint plane is conform, a favourable diagnosis is issued and a signal authorising welding is sent to the control system.

The welding is effected by a pulsed laser beam while the fuel element is rotating.

Figure 12:
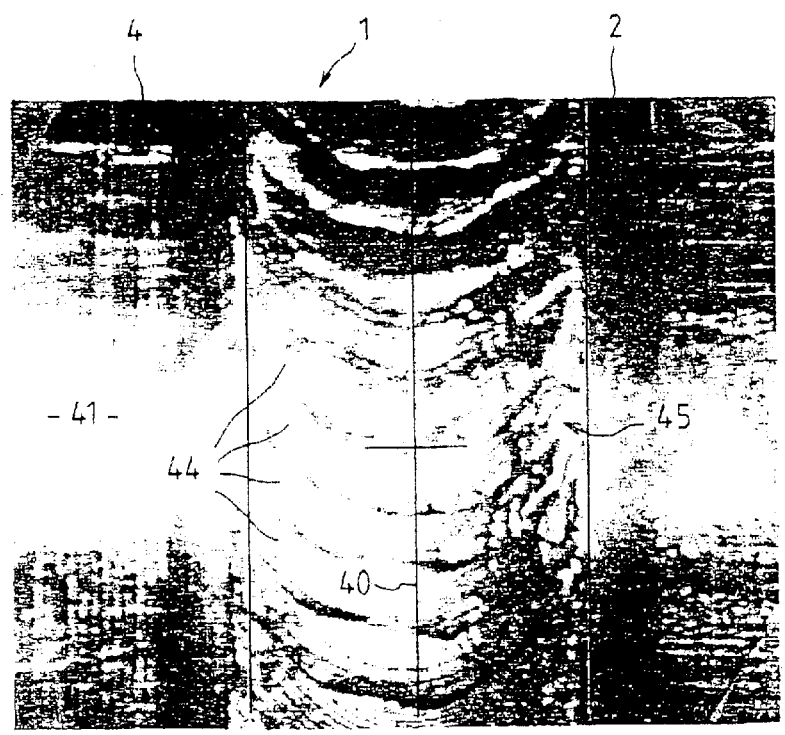
FIG. 12 is an image shown on the screen of the inspection system when the method according to the invention is used to inspect a laser weld.

In FIG. 12, the weld 45 made by the pulsed laser beam and centred on the reference line 40 includes successive waves 44 of substantially circular shape each corresponding to one firing of the laser. The distance between the waves 44 in the vertical direction of the image, representing the circumferential direction of rotational movement of the fuel element, corresponds to the movement between two successive pulses of the laser beam.

Digitized images are acquired continuously, the next image being acquired during the processing of the previous image.

The left-hand and right-hand edges of the weld are located and their positions relative to the reference line 40 are determined. The width of the weld is also determined, from the positions of the edges of the weld.

Because there is a correlation between the width of a laser beam weld and the depth of penetration of the weld, it is possible to determine from the width of the weld how deep the weld has penetrated into the sleeve and the plug of the fuel element.

Figure 13:
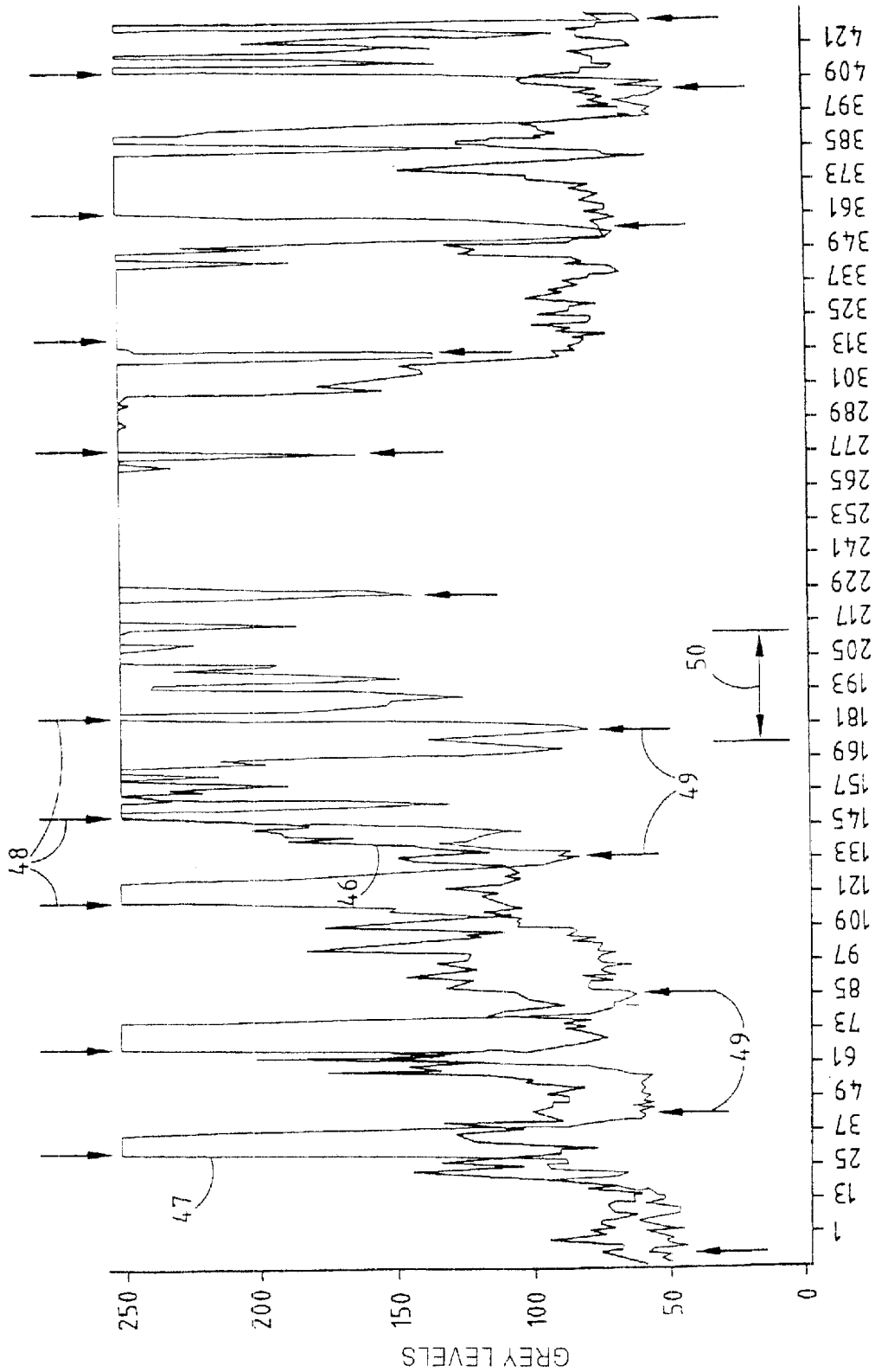
FIG. 13 is a diagram referred to in the description of the method of inspecting a pulsed laser weld.

FIG. 13 is a diagram showing the grey levels, on a scale from black to white, of the pixels of an image of the weld in a first column of the image (i.e. along a vertical line of the image, corresponding to a peripheral circular line on the fuel element in a plane perpendicular to the axis of the fuel element) inside the weld and in a second column of the image outside the weld.

The curve 46 corresponds to a column of the image outside the weld and the curve 47 to a column of the image inside the weld.

The successive waves of the weld are reflected in peaks and troughs indicated by the respective arrows 48 and 49.

The arrow 50 shows the distance the fuel element moves in a time period corresponding to the period of the laser beam pulses.

Diagrams similar to the FIG. 13 diagram are produced for each column of the image of the weld and each diagram obtained, similar to the FIG. 13 diagram, is searched for pairs of transitions between a trough and a peak which have a period consistent with the period of the welding pulses.

Figure 14:
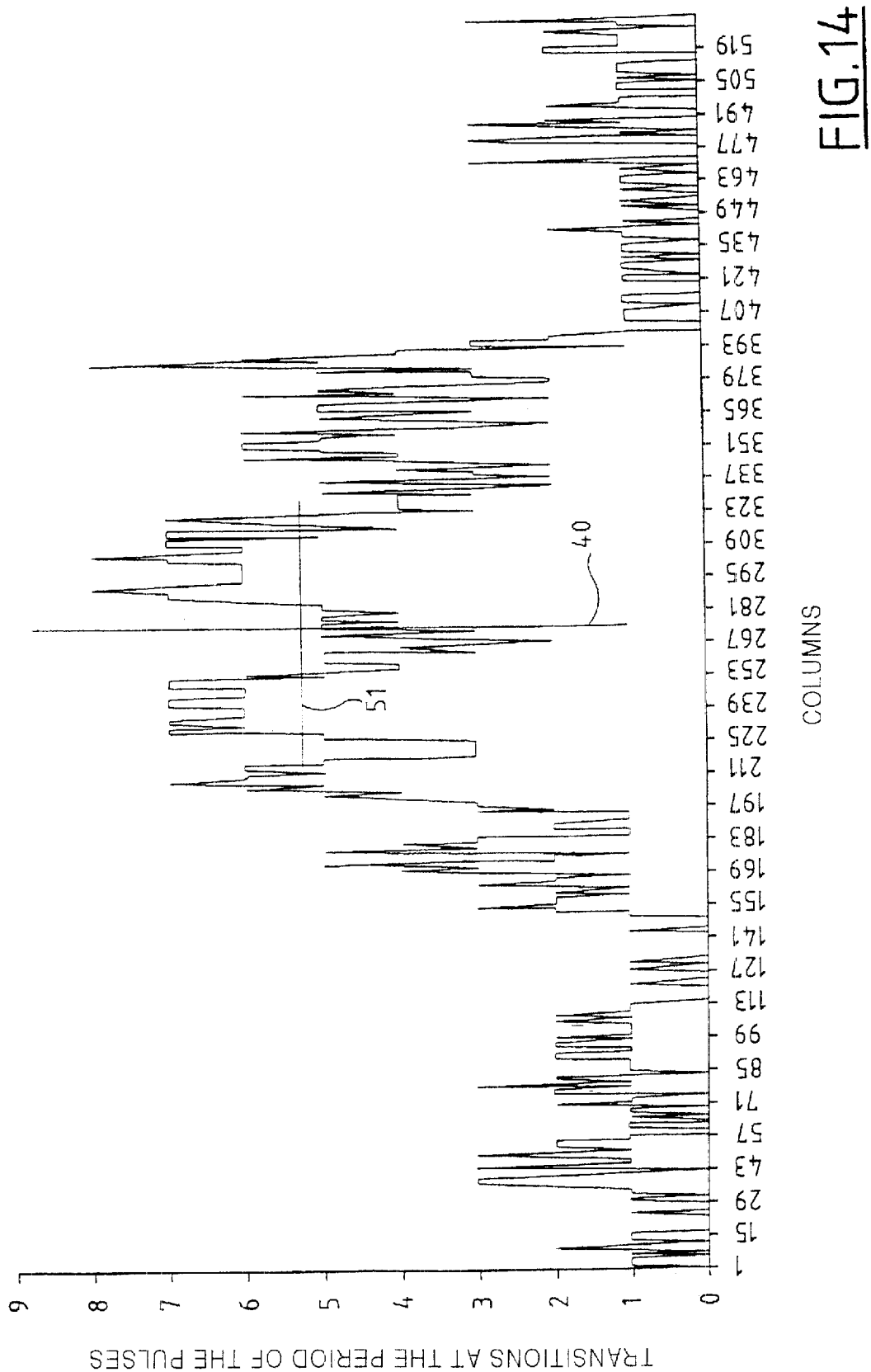
FIG. 14 is a diagram referred to in the description of the method of inspecting a pulsed laser weld.

The number of transitions consistent with the period of the welding pulses is logged for each column of the weld and for the areas adjoining the lateral edges of the weld. FIG. 14 shows the number of transitions as a function of the columns of the image.

FIG. 14 shows the reference line 40 and the peaks corresponding to the number of transitions consistent with the period of the welding pulses for each column of the image.

The maximum number of transitions in the portion of the diagram to the left of the reference line 40 is determined, and is referred to as the left-hand maximum.

Similarly, the maximum number of transitions in the portion of the diagram to the right of the reference line is determined, and is referred to as the right-hand maximum.

The central mean of the transitions between the left-hand maximum and the right-hand maximum is also determined and is shown by the straight line segment 51 parallel to the abscissa axis.

A weld is deemed to have been executed on the fuel element if the left-hand maximum and the right-hand maximum are above a particular limit, for example 4, and the central mean is above a particular limit, for example 3.

A central mean above a particular limit indicates the presence of a weld in the central area.

If the conditions relating to the left-hand maximum and the right-hand maximum and/or the central mean are not complied with, a search for the joint plane is conducted. If the joint plane is not found, inspection continues.

If the joint plane is found, a weld integrity defect diagnosis is issued.

Figure 15:
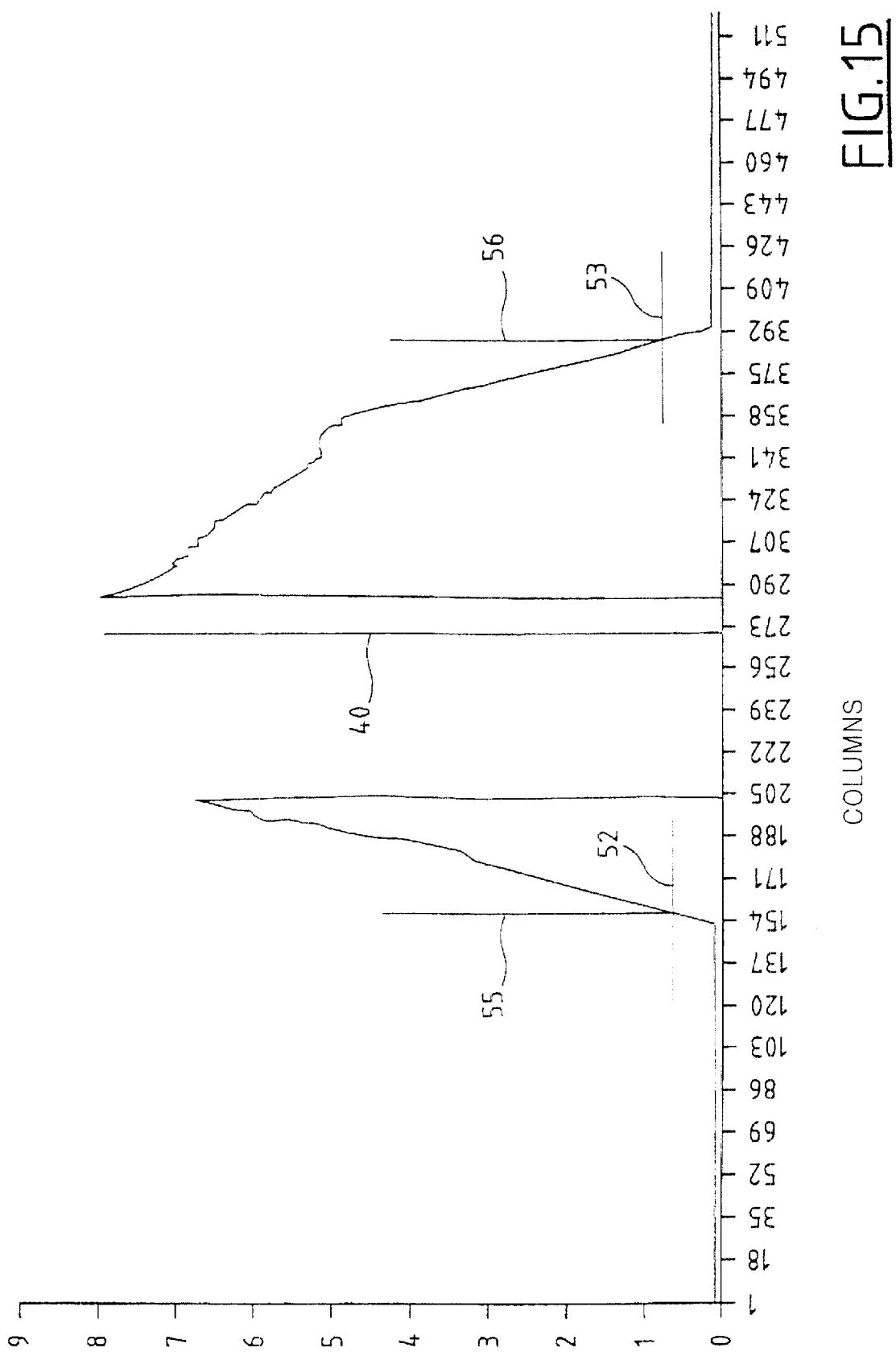
FIG. 15 is a diagram referred to in the description of the method of inspecting a pulsed laser weld.

The FIG. 15 diagram is produced by filtering the FIG. 14 diagram, and shows only transitions relating to the edges of the weld, excluding the central part.

A search for the left-hand edge of the weld 45 and a search for the right-hand edge are conducted successively.

To this end, a right-hand threshold and a left-hand threshold are calculated to provide a weld edge search criterion.

The right-hand threshold is defined by the following equation, in which x is a parameter referred to as the right-hand weld search threshold:

$$RH \text{ threshold} = RH \text{ min} + x\% \text{ of } (RH \text{ max} - RH \text{ min}).$$

Similarly, the left-hand threshold is defined by the following equation, in which y is a parameter referred to as the left-hand weld search threshold:

LH threshold=LH min+y% of (LH max−LH min).

The values of x and y are determined according to the fuel element illumination conditions.

If one of the above parameters is not satisfactory for precise determination of the edges, it is adjusted by entering a new value of the parameter into the processing software.

The search for the left-hand edge and the right-hand edge is conducted from threshold values represented by straight line segments 52 and 53 in FIG. 15, for example by searching for a particular number of pixels below the threshold in a first direction from a maximum followed by a pixel above the threshold in the second direction. For example, five points are searched for under the threshold in one direction and then one point above the threshold in the second direction. This produces the position of the left-hand edge and the right-hand edge along the columns of the image, represented in FIG. 15 in the form of vertical segments 55 and 56, and the position and the width of the weld 45 are determined in this way from the number of columns between the left-hand and right-hand edges and between those edges and the edge of the window for determining their positions; these values are compared to threshold values constituting the following parameters of the processing system: left-hand marker, position tolerance and right-hand marker position tolerance.

The width is also compared to a threshold value constituting a lack of weld minimum width parameter.

If three consecutive widths less than the minimum width are encountered when the successive images of the welds are processed, the absence of a weld is deduced and inspection is stopped. The weld is declared defective. If three consecutive widths less than the minimum width are not encountered, inspection continues and at the end of inspection the positions and widths of the weld are averaged and then compared to the position limits (right-hand position tolerance, left-hand position tolerance) and width limits (minimum weld width) in order to issue a final verdict that is sent to the control system.

The results are displayed on the screen of the microcomputer.

The rotation of the fuel element is also verified at the end of inspection by examining the measured width of the weld throughout the length.

If too few widths depart from the mean value, a diagnosis relating to non-rotation of the fuel element is issued.

Figure 16:
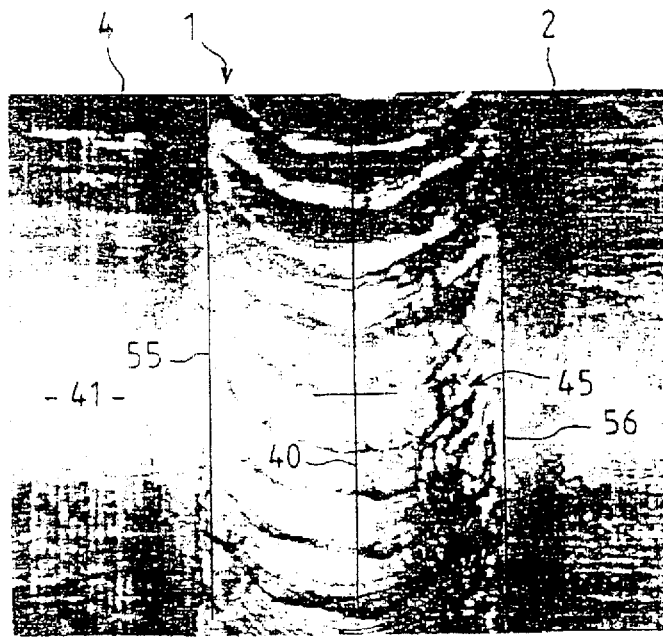
FIG. 16 is an image shown on the screen of the inspection system when inspecting laser welds.
Figure 17:
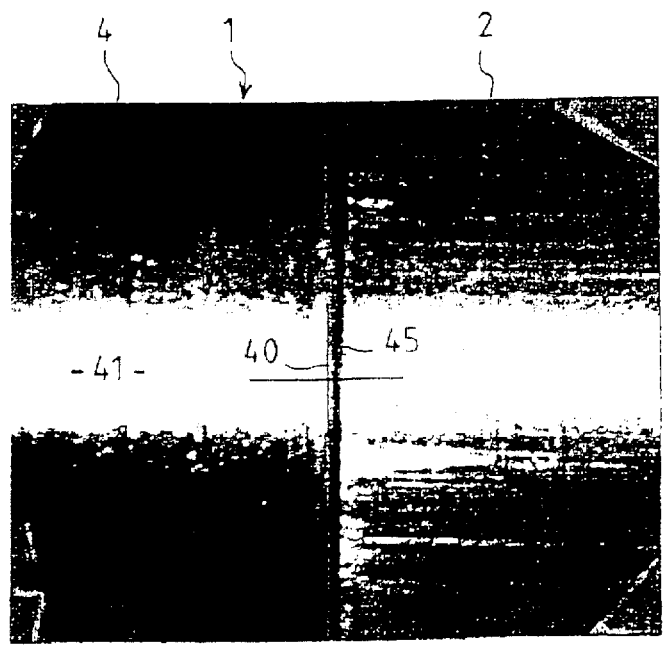
FIG. 17 is an image shown on the screen of the inspection system when inspecting laser welds.

FIGS. 16 and 17 illustrate the image displayed on the screen at the end of inspection. In FIG. 16 (which is substantially the same as FIG. 12), a conforming weld. In FIG. 17, the weld is non-existent and deemed to be non-conforming.

The invention therefore enables the joint plane to be inspected at the welding station itself, prior to welding, and the weld to be inspected with particular reference to the quality and continuity of the weld.

The system can operate in masked time relative to the welding operation.

In the case of laser beam welding, the penetration of the weld is checked by the correlation between the width of the weld and its penetration. This parameter is meaningless in the case of TIG welding.

The method according to the invention is used at the welding station, during the welding operation, which avoids all handling operations to transfer the fuel elements between the welding station and an inspection station. The verdict relating to the conformance of the weld is available as soon as the welding operation is finished.

The information concerning the operation as a whole (welding, positioning and inspection) can be saved on a hard disk for use afterwards in the form of a database.

Finally, the illumination system used by the imaging means is a standard illumination system available off the shelf.

The invention is not strictly limited to the embodiments described.

Thus the method of inspecting the joint plane may be applied to any method of welding plugs to nuclear fuel elements.

The digitized images of the weld may be processed by methods other than those described in the case of laser beam welding.

Finally, the method according to the invention applies to any nuclear fuel element including sealed closure plugs inserted into end portions of the sleeve of the fuel element.

What is claimed is:

1. A method of inspecting welding of a sealed closure plug of a fuel element for a nuclear reactor, the fuel element having a tubular sleeve enclosing a plurality of nuclear fuel pellets stacked in an axial direction of the sleeve and two sealed closure plugs having a cylindrical part inserted coaxially into an axial end part of the sleeve, the plug welded in a welding station by melting the sleeve and the plug along a circular line in a joint plane perpendicular to the axial direction of the sleeve and the plug through welding directed radially relative to the circular line in the joint plane of the sleeve and the plug, which are coupled to a rotation arrangement for rotation about a common axis, inspection effected by processing digitized optical images of areas of the fuel element adjoining the circular line and distributed along a periphery of the fuel element, the method comprising:

rotating the sleeve and the plug about the common axis with aid of the rotation arrangement before welding the plug and the sleeve, the plug and the sleeve configured in a welding position at the welding station, wherein images are taken along the periphery of the fuel element to obtain the digitized optical images which are analyzed to determine a position of the joint plane, and a rotation of the fuel element is verified;

deducing at least one of to perform the welding or not to perform the welding; and taking images, if the welding is performed after welding the plug to the sleeve of the fuel element of the fuel in the position at the welding station, along a circumference of the external surface of the fuel element in a vicinity of the line to obtain the digitized optical images, the digitized optical images analyzed to check a conformance of as weld a long the line.

2. The method according to claim 1, further comprising:

determining a reference line in the digitized optical images prior to welding, the reference line positioned in a vertical direction of an image corresponding to a circumferential direction of the fuel element, in a plane perpendicular to the axis of the fuel element, and determining grey levels of pixels of the images along search lines perpendicular to the reference line to determine a position of two edges of the joint plane in two planes perpendicular to the axis of the fuel element.

3. The method according to claim 2, further comprising:

determining a mean search fine from N adjoining search lines that are determined on a diagram of the grey levels on the mean search line and a detection threshold of the joint plane and comparing the grey levels along the mean search line to the detection threshold to determine the position of the edges of the joint plane, wherein N is an integer greater than 0 determined by a user.

4. The method according to claim 3, further comprising:
determining a distance in a direction of the axis of the fuel element between the reference line and at least one edge of the joint plane.

5. The method according to claim 2, wherein positions of the edges of a weld are determined relative to the reference line.

6. The method according to claim 1, wherein during a pulsed laser welding, establishing diagrams of grey levels along each column of the image corresponding to peripheral directions of the fuel element, in planes perpendicular to the axis of the fuel element, and, on a curve obtained for each of the columns of the image, determining transitions between minima and maxima of the curve which have a period consistent with a pulsed laser beam period, and, for each of the columns of the image, determining a number of the transitions having a period equal with the pulsed laser beam period to obtain a curve of a distribution of the transitions along the columns of the image, the curve giving the number of transitions per column which is filtered to obtain a curve of the distribution of the transitions in a vicinity of each edge of the weld, and determining a threshold value according to each edge area of the weld, and determining a condition of edges of the weld by determining columns in which a number of transitions are below the threshold.

7. The method according to claim 6, further comprising:
determining a width of the weld between the edges in the direction of the axis of the fuel element and deducing a depth of penetration of the weld therefrom by correlation.

8. The inspection method according to claim 1, wherein during a laser beam welding where a fixed reference line is disposed along a laser beam welding axis, determining the position of the joint plane relative to the fixed reference line.

* * * * *

UNITED STATES PATENT AND TRADEMARK OFFICE
CERTIFICATE OF CORRECTION

PATENT NO. : 6,665,363 B1
DATED : December 16, 2003
INVENTOR(S) : Philippe Mahe

It is certified that error appears in the above-identified patent and that said Letters Patent is hereby corrected as shown below:

<u>Title page,</u>
Item [73], please change "Courbecoíe" to -- Courbevoíe --;
Item [30], please change "August 9, 2000" to -- September 22, 1999 --;

<u>Column 3,</u>
Line 46, please change "FIGS." to -- FIG --;

<u>Column 12,</u>
Line 54, please change "as weld a long the line" to -- a weld along the line --;
Line 66, please change "mean search fine" to -- mean search line --.

Signed and Sealed this

Fourth Day of May, 2004

JON W. DUDAS
*Acting Director of the United States Patent and Trademark Office*